United States Patent [19]

Hartig

[11] 4,069,807
[45] Jan. 24, 1978

[54] HOT AIR HEATER

[75] Inventor: Martval John Hartig, Wilmington, Del.

[73] Assignee: E. I. Du Pont de Nemours and Company, Wilmington, Del.

[21] Appl. No.: 675,765

[22] Filed: Apr. 12, 1976

[51] Int. Cl.[2] ............................................. F24H 3/06
[52] U.S. Cl. ............................... 126/110 R; 60/39.57; 126/360 A; 165/166
[58] Field of Search ............... 126/360 R, 360 A, 113, 126/110 R, 110 B; 60/39.57; 165/DIG. 8, 166, 169; 237/9 B

[56] References Cited

U.S. PATENT DOCUMENTS

| | | | |
|---|---|---|---|
| 2,046,813 | 7/1936 | Dunham et al. | 237/9 B X |
| 2,767,784 | 10/1956 | Dean | 126/360 R X |
| 2,878,644 | 3/1959 | Fenn | 60/39.57 |
| 3,060,921 | 10/1962 | Luring et al. | 126/360 A X |
| 3,194,229 | 7/1965 | Borgeson | 126/360 R |
| 3,503,383 | 3/1970 | Meyer | 126/360 R |
| 3,568,658 | 3/1971 | Brock | 126/360 A |
| 3,733,244 | 5/1973 | Sanberger et al. | 165/166 |
| 3,940,301 | 2/1976 | Straw et al. | 165/166 X |

*Primary Examiner*—William E. Wayner
*Assistant Examiner*—William E. Tapolcai, Jr.

[57] ABSTRACT

A high efficiency hot air heater is disclosed in which the combustion products of a flame are forced through water in a contacting device. The combustion products and whatever moisture is evaporated are passed through a heat exchanger to heat air such as for a home. The moisture which condenses in the heat exchanger is returned to the water contactor and the combustion products are vented to the atmosphere. Due to the low temperature of the combustion products and evaporated water, a plastic heat exchanger can be used, which is low enough in cost to permit using a large unit for maximum heat utilization.

7 Claims, 3 Drawing Figures

HOT AIR HEATER

BACKGROUND OF THE INVENTION

At present most hot air heaters burn a fuel which generally is either No. 2 fuel oil or gas, the combustion products of which pass through a heat exchanger and then are vented into the atmosphere. The air from the building or other space to be heated is passed from the cold air return through the other side of the heat exchanger and back through the building. Due to the high temperature of the gas going up the vent to the atmosphere a considerable amount of heat is lost. Generally conventional gas fired heaters are about 70 to 75% efficient while conventional oil fired heaters are about 65 to 70% efficient. The present heater generally will provide efficiencies of up to about 98% which enables a considerable reduction in the amount of fuel consumed in heating the building or other space to be heated.

SUMMARY OF THE INVENTION

The present invention relates to a hot air heater having improved efficiency. While any combustible fuel can be used by the heater, the conventional gas or No. 2 fuel oil are the preferred fuels. The combustion products from the burning fuel and some excess air are drawn or forced through a water contacting device to cool the combustion gases and transfer heat to the water, part of which is thereby evaporated. The combustion gases and evaporated water are then transported through a heat exchanger where they are cooled and most of the evaporated water condensed and returned to the water contacting device. The combustion gases and uncondensed water are vented to the atmosphere using a forced air system. Air to be heated for a home, building or other use is passed through the other side of the heat exchanger to receive heat from the moist combustion gas. Combustion products' sensible heat which is transferred to evaporating water as latent heat is recovered by condensation in the room air heat exchanger, which also cools the combustion products to be vented minimizing heat loss up the stack.

DETAILED DESCRIPTION

Figure 1:
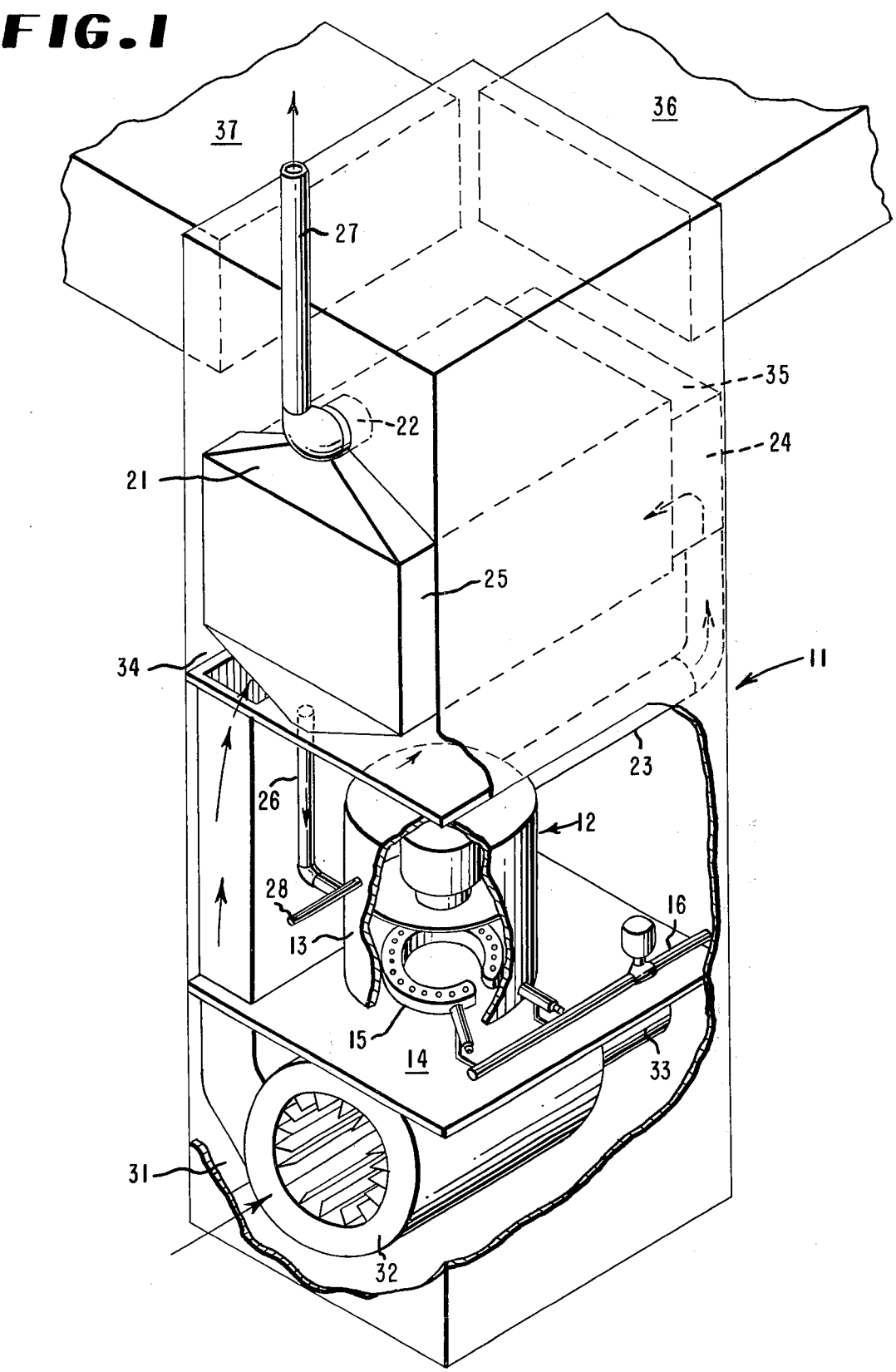
FIG. 1 is an overall view of one embodiment of the heater of the present invention.

Referring now to the illustrative example embodiment in FIG. 1, a home heater indicated generally as 11 is fitted with a burner and water contacting device which here is a bubble cap assembly and housing indicated generally as 12. The housing 13 is mounted on shelf 14. The bottom of housing 13 contains burner manifold 15 which is fed with fuel by pipe 16.

The top of manifold 21 is fitted with blower 22 which serves to draw combustion products and evaporated moisture through bubble cap assembly and housing 12 and draw such combustion products and evaporated moisture through duct 23 into heat exchanger manifold 24 through heat exchanger 25 into manifold 21. Most of the evaporated moisture condenses in the heat exchanger 25 so that manifold 21 is adapted to collect moisture and return it to bubble cap assembly and housing 12 by means of pipe 26. The combustion products are then vented to the atmosphere by means of stack 27. Blower 22 forces combustion products up the stack, said force replacing the thermal draft for a conventional furnace. Housing 13 is fitted with drain 28 to remove water which is formed by combustion of fuel and condensed in the heat exchanger 25. Pipe 26 can be used to occasionally fill the bubble cap.

Figure 3:
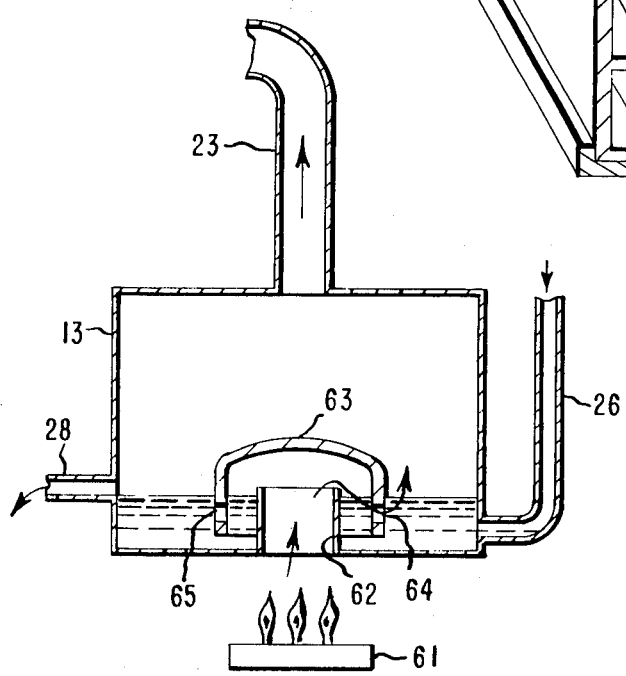
FIG. 3 is a cross-section of the water contacting bubble cap assembly shown in FIG. 1.

Another view of the bubble cap embodiment is shown in FIG. 3 which is an elevation cross section of that part of the heater. Burner 61 produces hot combustion products which are passed up short chimney pipe 62 into bubble cap 63 and exit the bubble cap under the water through openings around the skirt at 64 and 65. The bubble cap is a cylinder closed at the top but open at the bottom as shown. Combustion products bubble through and evaporate some of the water in a pool at the bottom of housing 13. The top of chimney 62 is high enough to keep water from overflowing onto the burner, the water level being determined by placement of overflow outlet 28. Moisture laden combustion products now cool enough for a plastic heat exchanger pass from housing 13 through duct 23 to the room air heat exchanger.

Returning now to FIG. 1, a conventional home cold air return not shown is connected to plenum chamber 31 containing blower 32 driven by motor 33 and adapted to force cold home air into plenum chamber 34 through heat exchanger 25 and thence into plenum chamber 35 which is connected to hot air ducts 36 and 37 which feed hot air to the home. The controls used to prevent plenum chamber overheating, for burner ignition, and for blower operation are not shown because they are conventional. If desired, a coil of pipe can be placed in contact with the water in the bubble cap housing and connected to the domestic water heater to provide heating capacity therefor.

Figure 2:
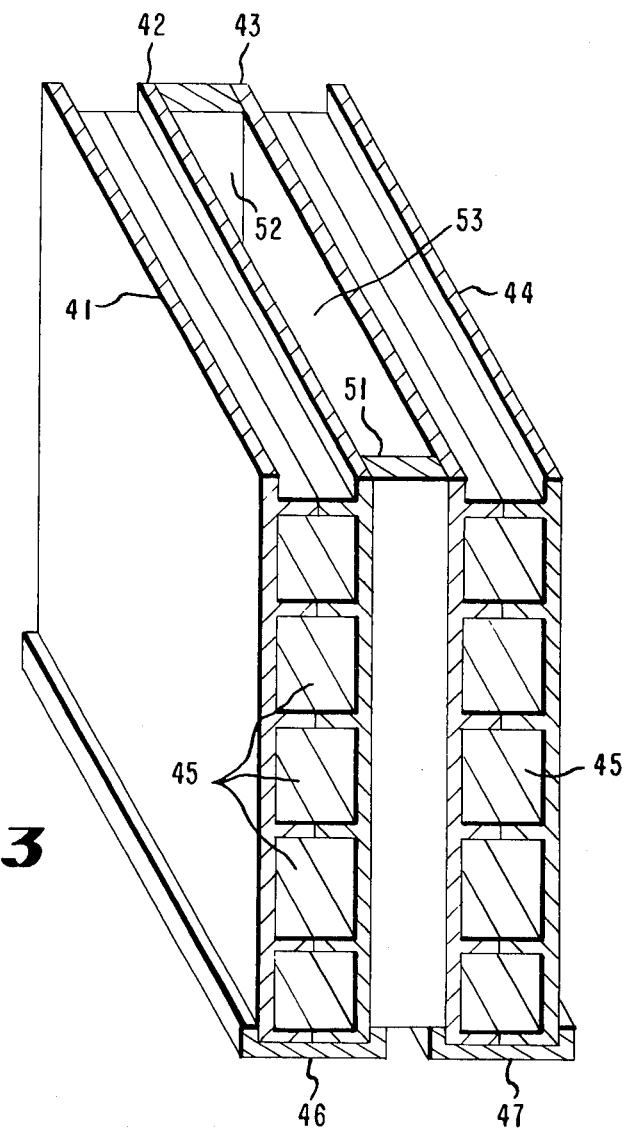
FIG. 2 is a detailed blow-up of the interior of a section of one embodiment of the heat exchanger used in the present invention.

Referring now to FIG. 2 a partial section of one embodiment of the heat exchanger assembly is shown. This heat exchanger is formed from ribbed sheets 41, 42, 43 and 44 which are assembled with the horizontal ribs of one sheet contacting the ribs of another ribbed sheet so as to form ducts 45 through which the combustion products can pass. The ends of each pair of ribbed sheets are held together by channels 46 and 47. The pairs of ribbed sheets 41, 42, 43 and 44 are spaced apart from each other by means of vertical bars 51 and 52 to form opening 53 through which the home air passes upward. It is to be understood that there normally will be a plurality of bars similar to bars 51 and 52 in the heat exchanger and generally the spacing will be about one bar every 2 to 6 inches. Generally these bars will be about 0.01 to 0.03 inches wide by about 0.05 to 0.25 inches high to provide openings 53 corresponding to the height of the bars. The channels 46 are preferably heat sealed to ends of the ribbed sheets. The individual ribs of the ribbed sheet need not be fastened to the ribs of the opposite ribbed sheet. If desired, the ribs of one ribbed sheet can be formed with tongues and the ribs of the other ribbed sheet with grooves adapted to receive and grip the tongues in place. Generally the ribs will be of a height and spacing to form openings 45 which are from 0.05 to 0.2 inches wide and from 0.02 to 0.15 inches high. These dimensions have been found to achieve good heat transfer with low pressure drop across the heat exchanger while still being readily achievable using conventional construction techniques.

Generally the heat exchanger will have from 3 to 10 square feet of house air surface per 1,000 Btu per hour burner capacity. A conventional 4 inch bubble cap common in chemical distillation equipment is adequate for a heater of 100,000 Btu/hour capacity. The bubble cap and housing and the water level therein is usually sized to provide combustion products which are fed to the heat exchanger at from 175° to 190° F. While a single stage heat exchanger is shown it is to be understood that multiple stage heat exchangers can be used if desired.

Design trade-offs including use of alternate materials of construction may call for a higher temperature so long as it is safely below the limit for the heat exchanger material. Other design alternatives may be used such as types, shapes, and arrangements of components, spacing and fastening means, and types of control devices; all known in the art and within the spirit of the invention. If desired, for example, the bubble cap can be replaced by other water contacting means such as drawing the combustion gas through a falling curtain of water or by drawing the combustion gas down a passage and through a pool of water at the bottom of the passage. Alternatively, a water spray chamber, wet mats or wet plates can be used. Obviously many other modifications of the basic invention can be made. For instance, a salt can be added to the water in the bubble cap to raise the temperature of the moist combustion products. One advantage of the system of the present invention is that a relatively small burner and bubble cap can be placed on the floor in a small space and the heat exchanger, which heats the building air can be placed in existing ductwork thereby minimizing the space taken up by the heater.

The ribbed sheets and preferably also the spacer bars and end channels in the specific example cited are formed by extrusion of a synthetic thermoplastic resin from a suitable die. The ribbed sheets can conveniently be formed by the technique shown in any of U.S. Pat. Nos. 3,509,005; 3,515,778; 3,635,631; or 3,664,906. The thermoplastic resin used should have a softening point about 220° F or above and be reasonably rigid. A modulus of elasticity in flex of greater than 10,000 psi provides adequate rigidity. The preferred thermoplastic resins for use in forming the ribbed sheets are high density polyethylene, isotactic polypropylene, acrylonitrile-butadiene-styrene resins, styrene-acrylonitrile copolymers, and fluorocarbon resins such as fluorinated ethylene-propylene copolymers and polytetrafluoroethylene. The high density polyethylene and isotactic polypropylene are especially preferred because of their low cost. The invention, however, is not limited as to materials of construction. For example, anodized aluminum foil or copper-plated steel heat exchangers can be used if desired.

I claim:

1. A heater comprising a burner, means to conduct combustion products into contact with a liquid comprising water, said means being sized to provide combustion products at a temperature of from about 175° F to about 190° F, a blower adapted to transport from said burner through said liquid and urge said combustion products through a heat exchanger, which is made from a thermoplastic resin, which has from 3 to 10 square feet of air surface per 1,000 Btu per hour burner capacity, which heat exchanger is adapted to exchange the heat from said combustion products with forced air.

2. A heater comprising a burner, a chimney adjacent said burner which chimney protrudes through a body of water into a bubble cap, means to maintain said water at a predetermined level such that the combustion products from said burner are at a temperature of from about 175° F to about 190° F, a blower adapted to transport combustion products from said burner through said water and urge said combustion products through a heat exchanger, which is made from a thermoplastic resin, which has from 3 to 10 square feet of air surface per 1,000 Btu per hour of burner capacity is adapted to exchange heat from said combustion products with forced air.

3. The heater of claim 2 wherein means are provided to remove condensate from said heat exchanger and return said condensate to said bubble cap.

4. The heater of claim 3 wherein there are provided a plurality of thermoplastic resin passages adapted to conduct air, and there are provided adjacent thereto passages adapted to conduct combustion products in a direction essential at right angles to the direction in which the air is conducted.

5. A process of heating air comprising burning a fuel to produce combustion products, passing the combustion products into contact with a liquid comprising water to produce a gas mixture of moisture and combustion products having a temperature of from about 175° F to about 190° F and passing said gas mixture through a heat exchanger made of a thermoplastic resin to heat air.

6. The process of claim 5 wherein moisture is condensed in the heat exchanger and returned to liquid comprising water through which is contacted with the combustion products.

7. The process of claim 5 wherein the heat exchanger is operated in a plurality of stages with the flow of air at essential right angles to the flow of moisture and combustion products.

* * * * *